Jan. 6, 1942.   O. STEINER   2,269,400
HIGH-SPEED BETWEEN-THE-LENS PHOTOGRAPHIC SHUTTER
Filed Nov. 30, 1940   4 Sheets-Sheet 3
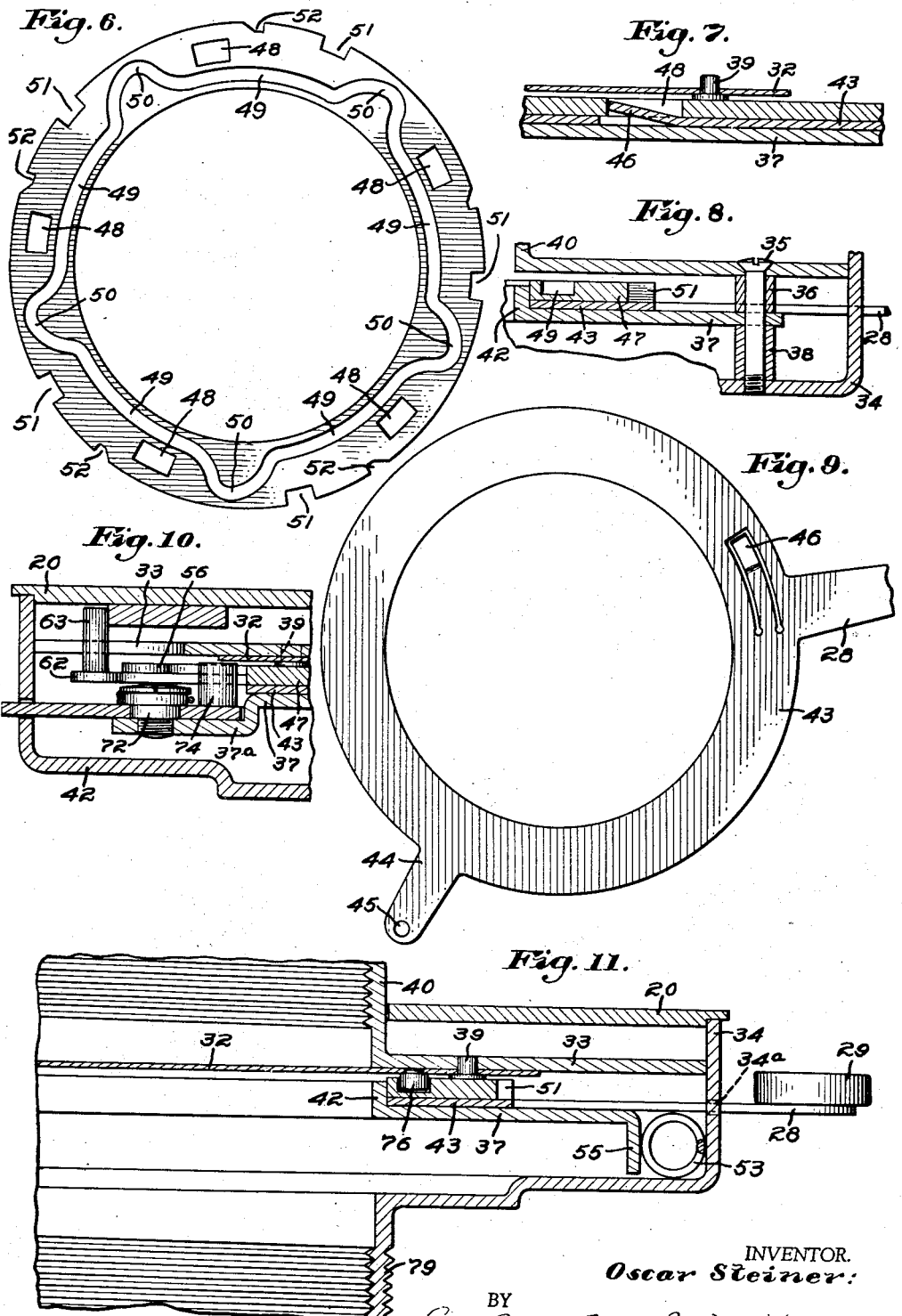
INVENTOR.
Oscar Steiner:

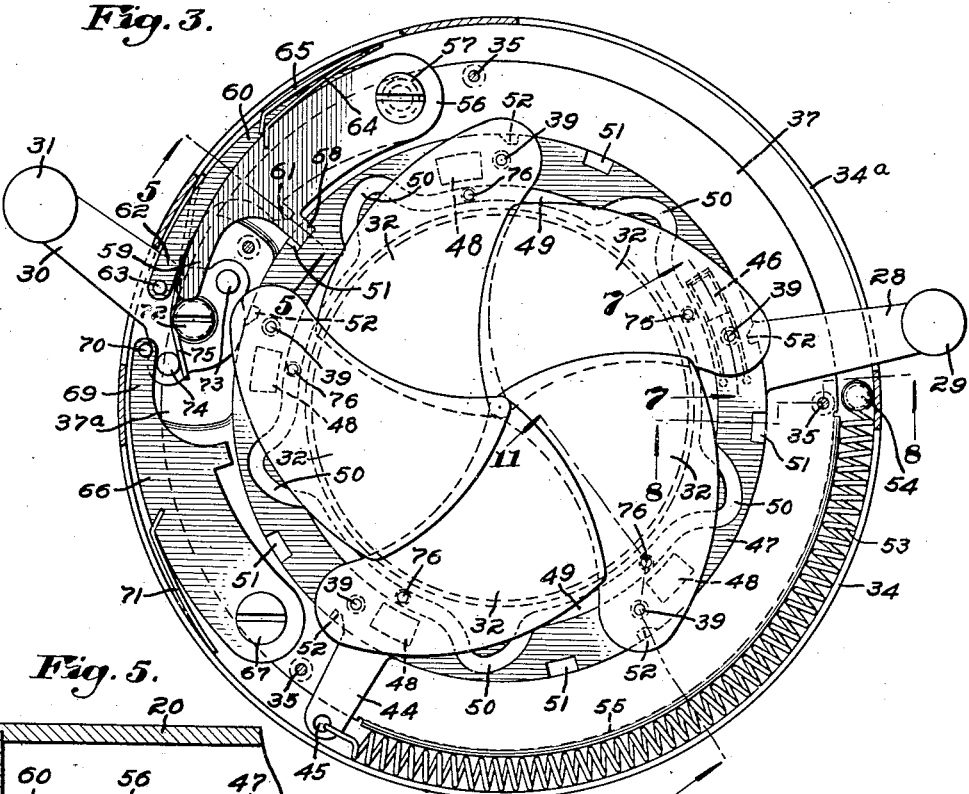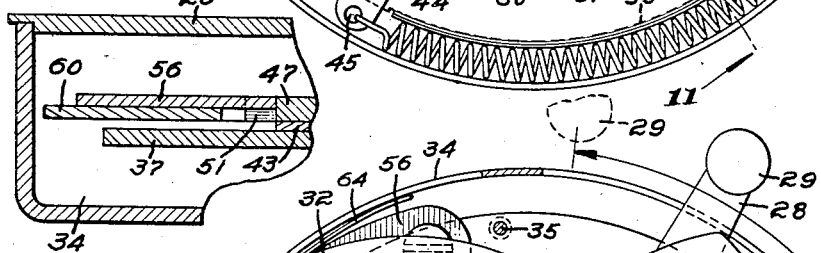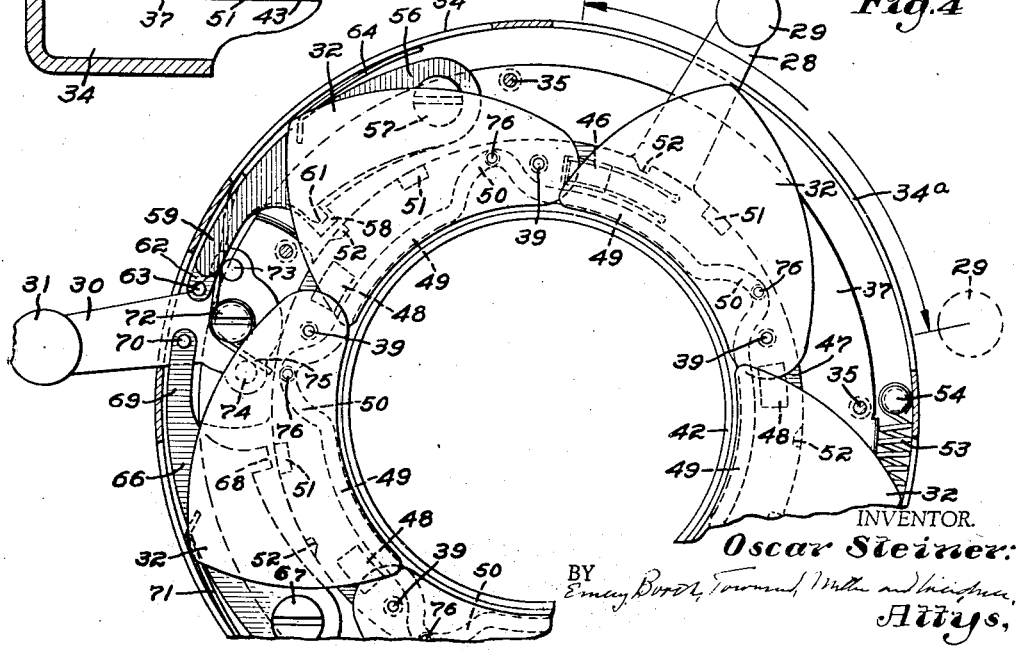

Jan. 6, 1942.    O. STEINER    2,269,400
HIGH-SPEED BETWEEN-THE-LENS PHOTOGRAPHIC SHUTTER
Filed Nov. 30, 1940    4 Sheets-Sheet 4
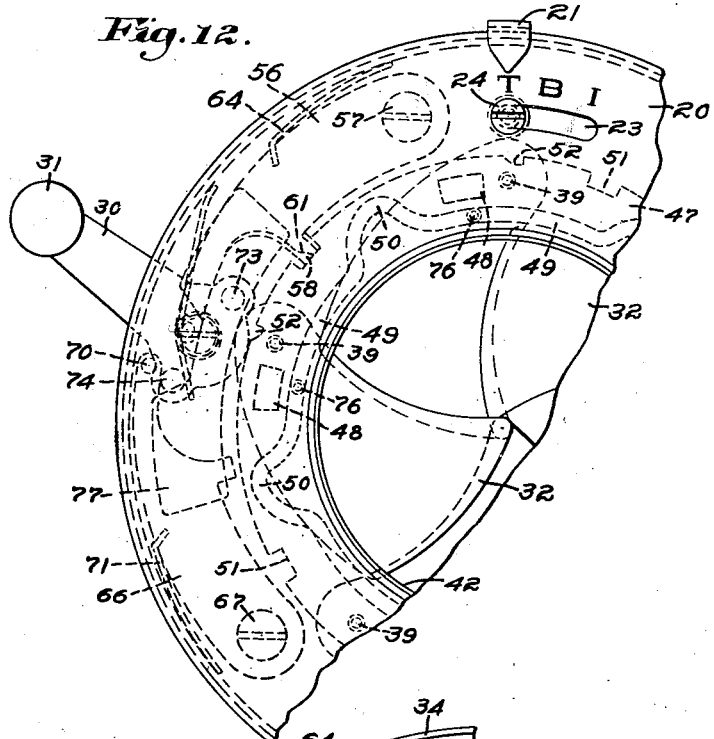
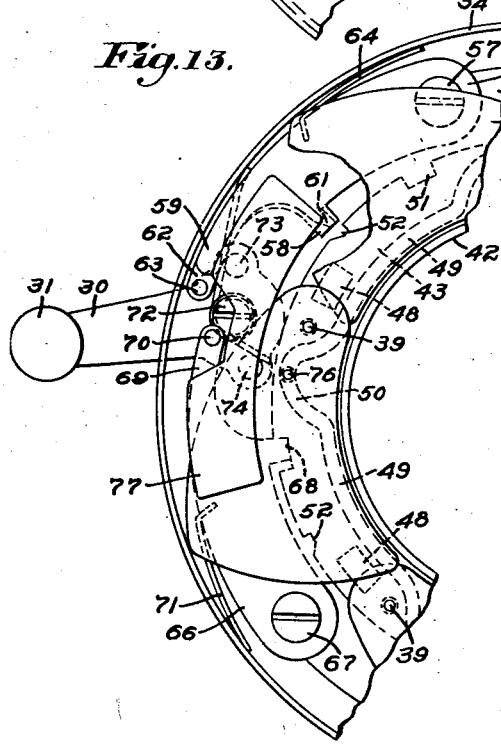
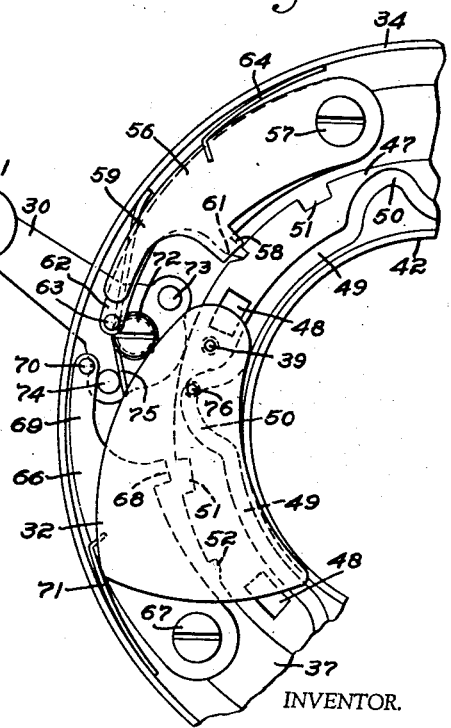
INVENTOR.
Oscar Steiner
BY
Attys.

Patented Jan. 6, 1942

2,269,400

UNITED STATES PATENT OFFICE 2,269,400

HIGH-SPEED BETWEEN-THE-LENS PHOTOGRAPHIC SHUTTER

Oscar Steiner, Rochester, N. Y., assignor to The Folmer Graflex Corporation, Rochester, N. Y., a corporation of Delaware Application November 30, 1940, Serial No. 368,011

23 Claims. (Cl. 95—63)

This invention relates to high speed shutters of the between-the-lens type.

In order that the principle of the invention may be readily understood, I have disclosed a single embodiment thereof in the accompanying drawings, wherein—

Fig. 3 is an elevational view similar to Fig. 1, but with the shutter setting ring or plate and the shutter leaf supporting plate removed, the shutter leaves being shown in their position at the commencement of an instantaneous exposure;

Fig. 4 is an elevational view similar to Fig. 3, but with the shutter released by the shutter release lever, the shutter leaf operating means having been moved in a contraclockwise direction and the leaves having reached a fully-opened position;

Fig. 5 is a sectional transverse detail taken on the line 5—5 of Fig. 3;

Fig. 6 is a plan view of the leaf-operating ring, having the leaf cams and the notches in the periphery of the operating ring for controlling the same while making an exposure;

Fig. 7 is a transverse vertical sectional detail on the line 7—7 of Fig. 3, showing the means for driving the shutter leaf operating ring;

Fig. 8 is a transverse vertical sectional detail on the line 8—8 of Fig. 3, showing the relative location of the shutter leaf operating ring and the actuating ring tension plate;

Fig. 9 is a plan view showing the shutter actuating ring tensioning plate with its driving dog;

Fig. 10 is a transverse vertical sectional detail on the line 10—10 of Fig. 1, showing the position and construction of the shutter operating means, the shutter being set for time exposure;

Fig. 11 is a partial transverse vertical section on the line 11—11 of Fig. 3, showing the relative positions of the shutter leaves, the shutter operating ring, the shutter actuating ring tensioning plate and the shutter tension ring;

Fig. 12 is a partial plan view showing the shutter set for time exposure, it being in a cocked or set condition prior to release;

Figure 1:
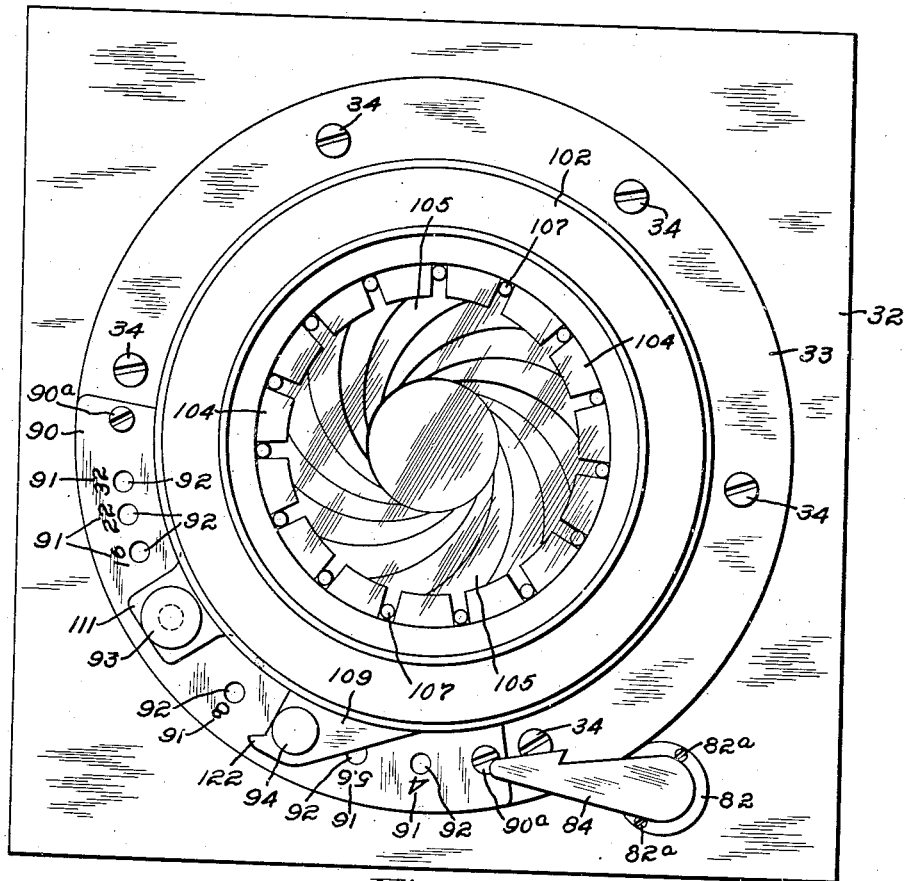
Fig. 1 is a front elevation of a high speed shutter of the between-the-lens type, showing the position of the shutter setting lever and shutter release lever, the shutter being shown as in the cocked or set position for instantaneous exposure.

Fig. 13 is a partial plan view similar to Fig. 12, but showing the shutter release lever depressed, allowing the shutter leaves to be opened for commencement of a time exposure; and Fig. 14 is a partial plan view similar to Fig. 12, but showing the shutter release lever released after the first downward stroke, the shutter leaves being still in the open position prior to a second downward movement of the shutter release lever at the completion of a time exposure, to allow the shutter leaves to be closed.

In the drawings, there is shown a high speed shutter of the between-the-lens type that, while particularly adapted to be used in cooperation or conjunction with a grid shutter disclosed in my application filed simultaneously herewith, Ser. No. 368,394, is also capable of independent use as an entirety in many different types of cameras. The between-the-lens shutter about to be described is of very high speed which is at least twice that of a conventional between-the-lens shutter of equal size. Such high speed has been secured by avoiding all reciprocating or to and fro movement of any of the parts of the shutter during an exposure, except, of course, the reciprocating opening and closing movements of the shutter leaves. The said between-the-lens shutter is provided with an operating or cam ring traveling in one direction only, the cam construction thereof being such as to allow the said operating ring to travel a considerable distance after release before the shutter leaves themselves are operated. The structure of the parts is such that the operating or cam ring can be stopped when the shutter leaves are in open position and the ring then be released to cause the shutter leaves to close. Moreover, selective means are provided to control the leaf operating or cam ring, so as to obtain different conditions of operation, thus permitting the shutter to be used as an instantaneous, a bulb or a time shutter.

Inasmuch as only a small portion of the travel of the shutter or leaf operating ring is utilized for actually making the exposure, a very rapid opening and closing of the shutter occurs, in contrast to the action in usual shutters wherein the leaves start to open as soon as the operating or cam ring starts to move. In such prior cases the operating or cam ring travels with the shutter leaves until the shutter is fully opened and then must be stopped and moved in the opposite direction. The maximum speed of such a shutter is therefore necessarily limited because of the time that must elapse to set the parts in motion, to stop them and again to set them in motion in the opposite direction.

shutter is to control the leaf-operating or cam ring 47 during exposure. The said levers, 56, 60 and 66 are controlled when making an exposure by the said shutter release lever 30, which, as indicated in Figs. 3 and 10, is attached to a depressed part 37a in the said inner shutter support plate 37 by means of a shoulder screw 72. The said shutter release lever 30, as shown in Fig. 3, has a duplex crank formation with opposite operating pins 73, 74. The said release lever 30 is caused to be moved in a clockwise direction under the influence of a spring 75, one end of which bears against the pin 74 and the other end against the shutter housing 34.

As shown in the several figures, to each of the shutter leaves 32 is attached an actuating pin 76 which pins ride in the concentric paths 49 and the cam paths 50 of the said leaf operating or cam ring 47. In Fig. 3, the said ring tension plate 43 has been shown as turned in a clockwise direction by means of the shutter setting or resetting lever 28 and its knob 29 until its further movement is stopped by the shutter housing 34. The said setting or resetting lever 28 moves in a slot 34a in the said shutter housing 34, and as the said lever 28 is moved in a clockwise direction, the leaf-operating or cam ring 47 is held from turning in a clockwise direction by reason of the dog 58 of the instantaneous release lever 56 engaging a notch 51, and as the said shutter actuating ring tensioning plate or member 43 is turned in a clockwise direction carrying with it the spring dog member 46, the latter engages one of the openings 48 of the said cam ring 47, when the shutter setting or resetting lever 28 reaches the end or is near the end of its travel. The shutter is now in the set condition, and for the purpose of explanation of an instantaneous exposure cycle, it will be assumed that only the instantaneous release lever 56 is provided for functioning, the other levers being held out of action by means to be described.

When the knob 31 of the shutter release lever 30 is turned in a contraclockwise direction viewing Fig. 3, the said lever is caused to rock about the screw 72 as an axis and against the tension of the spring 75 until the pin 73 engages the finger 59 of the said instantaneous release lever 56. A further movement of said shutter release lever 30, viewing Fig. 3, will cause the dog 58 of the instantaneous release lever 56 to be disengaged from its slot 51 of the leaf-operating or cam ring 47, which is now free to move, and inasmuch as the shutter actuating ring tensioning plate or member 43 is locked to the leaf-operating or cam ring 47 by the dog 46, the said ring 47 will now be driven in a contraclockwise direction by the spring 53. As the said cam ring 47 is turned in a contraclockwise direction, the said pins 76 of the several shutter leaves 32 ride in the concentric parts 49 of the said cam ring 47, and said pins 76 are then engaged by the cam shaped paths or formations 50 in the said leaf-operating or cam ring 47. In so doing, the said pins 76 of the several shutter leaves ride up (that is, radially outward) the cam paths or formations 50, thus swinging the said several shutter leaves 32 in a clockwise direction until the said shutter leaves are fully opened, as shown in Fig. 4. As the said leaf-operating or cam ring 47 continues to travel in a contraclockwise direction, the said shutter leaves 32 will be caused to move in a contraclockwise direction by the said cam paths or formations 50, thus causing them to be closed and the said shutter leaves will then be positioned as shown in Figs. 1, 2 and 3.

The said cam ring 47 will have then turned one fifth of a revolution, or 72 degrees, and will again appear as shown in Fig. 3, and the said leaf-operating or cam ring 47 will be engaged by the dog 58 of the instantaneous release lever 56. The shutter setting or resetting lever 28 will have been moved in a contraclockwise direction until stopped by one end of the slot 34a in the shutter housing 34 and the shutter setting knob 29 will be in the position shown in dotted lines in Fig. 4.

Figure 2:
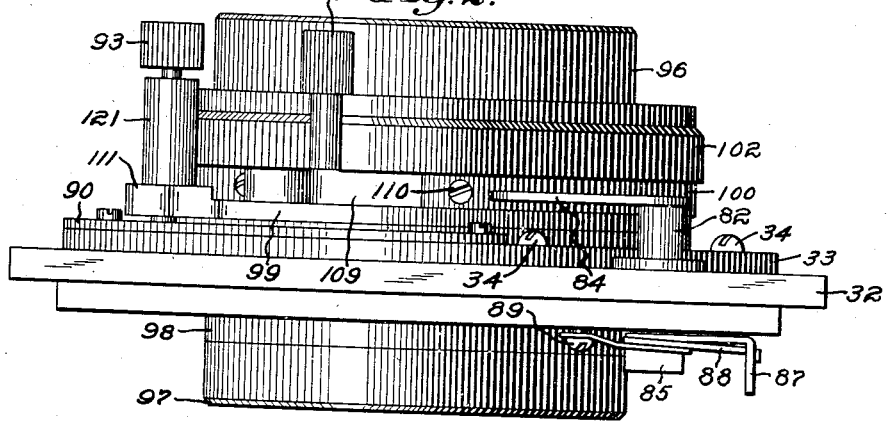
Fig. 2 is an elevational view similar to Fig. 1, the parts being in the same position, but with the shutter setting ring or plate removed, to show the operating parts of the release lever.

The cycle just described is for so-called instantaneous exposure and does not refer to the use of the time lever 60 or the bulb lever 66, inasmuch as when making an instantaneous exposure the said two levers are held out of action by the cam plate or cam formation 77, shown in Fig. 1, as having a cut-away central portion 78. The said cam plate or formation 77 is attached to the shutter setting ring or plate 20 and is shown in dotted lines in Fig. 1, wherein the pin 63 of the said lever 60 is held out of action by said cam plate or formation 77 and the said bulb lever is held out of action by the pin 70.

When the shutter setting ring or plate 20 is turned so that the letter "B", shown in Fig. 1, is directly under the index pointer 21, only the pin 63 will be engaged by the said cam plate or formation 77, and the pin 70 will be allowed to drop down in the opening 78 in the cam plate or formation 77 under the influence of the spring 71.

Before the commencement of the next exposure, it is necessary to return the shutter setting or resetting lever 28 in a clockwise direction until stopped by the end of the slot 34a, which will allow the dog 46 to engage a new opening 48 in the leaf-operating or cam ring 47.

Again referring to Fig. 3, wherein the shutter is shown as in a set condition ready to make an exposure, and the shutter setting ring or plate 20 is in position for a bulb exposure, it will be observed that the release lever 60 is held out of action by reason of the pin 63 engaging the cam plate or formation 77. A downward or contraclockwise pressure on the knob 31 of the shutter release lever 30 will cause such lever to rock on the screw 72 as an axis, carrying with it the pin 73, which will engage the finger 59 of the instantaneous release lever 56, withdrawing the dog 58 from its notch 51 of the leaf-operating or cam ring 47, which will now be caused to turn in a contraclockwise direction in the manner previously described.

As the said shutter release lever 30 is pressed downwardly or contraclockwise, viewing Fig. 3, the pin 74 is caused to turn about the screw 72 as an axis in a contraclockwise direction, moving away from the finger 69 of the said bulb action lever 66, allowing the dog 68 thereof to ride along the face of the leaf-operating or cam ring 47, being held thereto under the influence of the spring 71. Said dog 68 is of such size that it cannot engage any notch 52. The said cam ring 47 after having been released, will be stopped when the proper notch 51 thereof reaches and is engaged by the dog 68 of the bulb action lever 66. The shutter will now be in the condition or position of parts shown in Fig. 13, the shutter leaves being fully opened.

When pressure on the shutter release lever 30 is removed, the said shutter lever will be caused to turn in a clockwise direction about the screw 72 under the influence of spring 75, and the pin 74 will then engage the finger 69 of the bulb action lever 66, withdrawing its dog 68 from the notch 51 of the leaf-operating or cam ring 47, thus allowing the said cam ring 47 to complete its cycle, at which time the shutter setting or resetting lever 28 is returned to its position shown in dotted lines in Fig. 4 and the shutter will then be in closed position.

The leaf-operating or cam ring 47 will be in the position shown in Fig. 3, having been turned one fifth of a revolution, and a second notch 51 will be engaged by the dog 58 of the instantaneous release lever 56.

When the shutter setting ring or plate 28 is set in the position shown in Fig. 12, the cam plate or formation 77 will be moved to the position shown in Figs. 12 and 13, thus allowing the pin 63 of the release lever 60 and the pin 70 of the bulb action lever 66 to drop into the relieved or cut-away portion 78 of the cam plate 77.

Again referring to Fig. 3, wherein the shutter is shown in a cocked or set condition, it will be assumed that the shutter release lever 30 is pressed downward or in a contraclockwise direction, causing the pins 73 and 74 to turn about the screw 72, whereupon the pin 73 will engage the finger 59 of the instantaneous release lever 56, and also the finger 62 of the release lever 60, and a further movement will cause both said levers to be rotated in a clockwise direction about the screw 57, thus withdrawing the dog 58 from the notch 51. The leaf-operating or cam ring 47 will now start to move in a contraclockwise direction, and as the shutter release lever 30 is moved downwardly, the bulb action lever 66 will be allowed to move in a clockwise direction until the dog 68 thereof is in contact with the outer edge or face of the leaf-operating or cam ring 47, and as said ring continues to turn, a notch 51 thereof will be engaged by the dog 68 when the shutter leaves 32 reach their fully open position, that is to say, when the pins 76 thereof reach the highest or furthest-out radial position of the several cam paths or formations 50 on the leaf-operating or cam ring 47. The shutter mechanism will now be in the position shown in Fig. 13, with the leaf-operating or cam ring 47 held by the dog 68 engaging a notch 51. As the shutter release lever 30 is released, the pins 73 and 74 will be turned in a clockwise direction about the screw 72, allowing the instantaneous release lever 56 and the time release lever 60 to be moved in a contraclockwise direction about the screw 57. The dog 58 of the release lever 56 will ride on the face of the leaf-operating or cam ring 47, and the dog 61 of the release lever 60 will engage a notch 52 of the leaf-operating or cam ring 47. Just after the dog 61 engages a notch 52, the dog 68 will be disengaged from its notch 51, thus holding the leaf-operating or cam ring 47 in the position shown in Fig. 14, being held from further rotation by the dog 61. A second downward pressure on the said shutter release lever 30 will cause the pin 73 to turn about the screw 72 in a contraclockwise direction until the finger 62 is engaged, thus causing the lever 60 to turn about the pin 57 in a clockwise direction, withdrawing the dog 61 from its notch 52 and allowing the leaf-operating or cam ring 47 to complete its cycle in a contraclockwise direction. The shutter leaves will then close in the manner previously described and the said cam ring 47 will have traveled in a clockwise direction until it is stopped by an edge of the slot 34a in the shutter housing 34.

In this action a notch 51 of the said leaf-operating or cam ring 47 will have moved one fifth of a revolution, that is, 72 degrees, and a new notch 51 will be engaged by the dog 58 of the instantaneous release lever 56, thus holding the shutter in closed position until a second exposure is made.

The iris diaphragm of the shutter employed is not shown since it forms no part of the present invention. Making reference to Figs. 9 to 11, it will be evident that sufficient space is provided between the inner shutter support plate 37 and the housing 34 to receive or enclose such a diaphragm. The shutter housing is provided with the usual threaded cylindrical bushing 79 for attaching the rear lens cell and the usual lens mounting flange.

While in the drawings no means is shown for obtaining anything except one instantaneous speed, I provide, within the scope of my invention, for making slow shutter speeds and retarded instantaneous speeds.

Having thus described one illustrative embodiment of the invention, it is to be understood that although specific terms are employed, they are used in a generic and descriptive sense and not for purposes of limitation, the scope of the invention being set forth in the following claims.

I claim:

1. A between-the-lens photographic shutter having a series of leaves movable reciprocatingly to and fro to complete a single opening-and-closing act, a cam ring having a continuous cam path including a series of spaced cam formations, means operatively connecting said leaves to said cam path with its said cam formations to impart a to and fro movement of reciprocation to said leaves to complete each single opening-and-closing thereof, and means to move said cam ring in one direction only to effect by said cam formations all opening and closing movements of said leaves, said last mentioned means being operatively connected to said cam ring to turn it by steps in said one direction only, but at each such turning movement to turn it only to the extent of such part of a complete rotation of said cam ring as is necessary to cause the said shutter leaves to open and then to close in a single, complete, to and fro movement.

2. A combination according to claim 1, in which the cam ring is provided with a series of substantially inverted U shaped cam formations to impart the said opening and closing movements to said leaves, and substantially concentric pathways between and connected with said cam formations.

3. A combination according to claim 1, in which each shutter leaf is provided with an operating pin, and the cam path of the cam ring is a shutter-encircling cam shaped pathway wherein said operating pins are received.

4. A shutter structure according to claim 1, but wherein the number of such steps to complete one revolution of said cam ring is equal to the number of leaves of the shutter.

5. A shutter structure according to claim 1, but wherein said cam path has therein a series of cam formations equal to the number of leaves with which the shutter is provided, and by which cam formations the said leaves are reciprocatingly opened and closed.

6. A shutter structure according to claim 1, but wherein said cam ring has a series of spaced controlling formations and means to engage said formations while the exposure is being made.

7. A shutter structure according to claim 1, but wherein said cam ring has on its outer edge a series of spaced formations for controlling said cam ring when exposures are being made, and means to engage said formations to control said cam ring.

8. A combination according to claim 1, but in which said cam ring has one or more driving formations, and has driving means to engage the same to drive said cam ring in said one direction only, and has means to prevent rotation of said cam ring in the opposite direction.

9. A combination according to claim 1, but in which there is provided a detent engageable with said cam ring and also means is provided to disengage said detent from the cam ring to permit the start of an exposure cycle.

10. A combination according to claim 1, but in which the means to move the cam ring for operating the shutter leaves includes a shutter actuating ring tensioning plate and a tensioning spring connected to said plate.

11. A shutter structure according to claim 1, but wherein there is provided means to stop the operating movement of said cam ring when said leaves are fully open, for the purpose of bulb exposure.

12. A shutter structure according to claim 1, but wherein there is provided a detent cooperatively positioned to stop the operating movement of said cam ring when said leaves are fully open, to permit bulb exposure.

13. A shutter structure according to claim 1, but wherein there is provided a time-exposure permitting stop-detent to stop the operating movement of said cam ring when said leaves are fully open.

14. A shutter structure according to claim 1, but wherein there is provided a tension ring provided with a spring dog for driving said cam ring in such one direction only, to operate the same.

15. A shutter structure according to claim 1, but wherein there is provided a tension ring for imparting turning movement to said cam ring in such one direction only, a spring to turn said tension ring in one direction for effecting said turning movement of said cam ring, and handle means for turning said tension ring in the opposite direction.

16. A shutter structure according to claim 1, but wherein there is provided a tension ring adapted operatively to engage said cam ring to turn the same, a tension spring connected to said tension ring, and a plate having a formation to support said cam ring and said tension ring, and also having a formation to support said tension spring.

17. A shutter structure according to claim 1, but wherein a tension ring is provided having means to engage said cam ring, and thereby to turn the latter in one direction.

18. A shutter structure according to claim 1, but wherein a tension ring is provided having means to engage said cam ring to turn the latter, and a spring is provided to impart return movement to the said tension ring.

19. A structure according to claim 1, but wherein a tension ring is provided having means to engage said cam ring to turn the latter, and wherein said cam ring and said tension ring occupy a superposed relation to each other.

20. A structure according to claim 1, but wherein there is provided a shutter actuating ring tension plate having a spring dog member to engage said cam ring to turn the same, and spring means is provided to turn said tension plate.

21. A structure according to claim 1, but wherein the said cam ring has a series of spaced formations, and wherein there is provided a spring dog member and supporting means therefor to turn said cam ring in one direction only by engagement with said spaced formations.

22. A structure according to claim 1, but wherein the said cam ring is provided with a series of detent-receiving formations, and wherein there is provided a series of detents adapted respectively to engage said formations to control the shutter leaf opening, and wherein there is also provided a shutter setting ring having a formation to engage and control the functioning of said detents.

23. A structure according to claim 1, but wherein the said cam ring is provided with a series of detent-receiving formations, and wherein there is provided a series of detents adapted respectively to engage said formations to control the shutter leaf opening, and wherein there is also provided a shutter setting ring having a formation to engage and control the functioning of said detents, and wherein the said series of detents includes a time lever 65 and a bulb lever 66, and the said formation on the shutter setting ring is a cam plate 77 controlling the position of the said time and bulb levers.

OSCAR STEINER.

Jan. 6, 1942.   O. STEINER   2,269,401
LENS MOUNT FOR PHOTOGRAPHIC CAMERAS
Original Filed Jan. 12, 1940   3 Sheets-Sheet 1

Inventor:
Oscar Steiner,
by Emery, Booth, Townsend, Miller & Weidner
Attys.